United States Patent [19]

Nies

[11] Patent Number: 5,535,590
[45] Date of Patent: Jul. 16, 1996

[54] MASTER CYLINDER WITH APPLIED BRAKE COMPENSATION CAPABILITY

[75] Inventor: David L. Nies, Beavercreek, Ohio

[73] Assignee: General Motors Corporation, Detroit, Mich.

[21] Appl. No.: 417,556

[22] Filed: Apr. 6, 1995

[51] Int. Cl.⁶ .......................... B60T 11/26; B60T 11/28
[52] U.S. Cl. ............................................. 60/588; 60/589
[58] Field of Search .................... 60/533, 562, 585, 60/586, 587, 588, 589

[56] References Cited

U.S. PATENT DOCUMENTS

| | | | |
|---|---|---|---|
| 4,267,697 | 5/1981 | Hodkinson | 60/589 |
| 4,514,985 | 5/1985 | Cadeddu | 60/589 |
| 5,070,698 | 12/1991 | Savidan | 60/562 |
| 5,111,661 | 5/1992 | Savidan et al. | 60/562 |
| 5,146,751 | 9/1992 | Savidan | 60/562 |
| 5,161,375 | 11/1992 | Crumb et al. | 60/585 X |
| 5,179,834 | 1/1993 | Rauschenbach | 60/589 X |
| 5,214,917 | 6/1993 | Crumb et al. | 60/589 X |
| 5,328,178 | 7/1994 | Nies | 277/205 |

FOREIGN PATENT DOCUMENTS 2746260  9/1978  Germany ........................... 60/589

*Primary Examiner*—Hoang Nguyen
*Attorney, Agent, or Firm*—Jeffrey A. Sedlar

[57] ABSTRACT

A brake master cylinder includes a shiftable seal that provides an apparatus for maximizing compensation fluid flow during minimal fluid draw conditions such as occur through automatic traction control brake intervention type operation. The shiftable seal moves forward to compress a low load spring during fluid draw from the master cylinder's high pressure chamber to open a compensation flow path between the seal and the piston.

3 Claims, 4 Drawing Sheets

MASTER CYLINDER WITH APPLIED BRAKE COMPENSATION CAPABILITY

BACKGROUND OF THE INVENTION

The present invention relates to a master cylinder with compensation and more particularly, to a master cylinder with a low threshold of compensation by means of a shiftable seal.

Typical automotive brake master cylinders have two pressurizing chambers in a common bore with brake fluid being pressurized by dual primary and secondary pistons arranged in tandem in the bore. One of the pressurizing chambers is typically connected to a first brake circuit and the other pressurizing chamber is typically connected to a second brake circuit.

Such a conventional master cylinder generally has a pair of openings communicating with the bore adjacent each of the primary and secondary piston seals. The openings are connected to the master cylinder reservoir and extend to the bore. One of the openings, typically the larger of the two, is a compensating port located behind the seal of the associated piston. The other opening is a bypass hole, positioned in front of the seal of the associated piston.

When the master cylinder is actuated the pistons cause the seals to move across their respective bypass holes so that these openings are no longer fluidly connected with the pressurizing chambers. When this occurs, brake fluid in the pressurizing chambers and in the interconnected brake circuits is pressurized to actuate the brakes.

The piston seals must seal the pressurizing chambers within the master cylinders for high pressures which can exceed 3,000 psi when pressurizing the vehicle brakes. Compensation is generally, not a function that is required during normal brake applies. However, the seals are designed to allow fluid flow from an area rearward of the seals when the vehicle brakes are released. This allows compensating flow to enter the pressurizing chambers permitting fluid makeup to occur, such as during prolonged wear of the brakes wherein the wheel cylinders or brake calipers extend outward to a greater extent.

When the master cylinder is in a nonactuated or at-rest position, at least one of the piston seals will be located in the bore between the bypass hole and compensating port with the bypass hole being forward of the seal. In the piston at-rest position, the bypass hole allows adequate influx or outflow of brake fluid from the pressurizing chambers due to expansion or contraction of the brake fluid.

Typically, in brake systems with traction control (TC) type brake intervention functions there is a system hydraulic pump which, when needed, withdraws fluid from the upstream system. This takes fluid away from the master cylinder's pressurizing chambers. When fluid draw occurs there must be some method to provide rapid and responsive compensation of the fluid in order to provide the TC needs with a minimum of restriction to flow. The key is to provide a rapid transfer of fluid at as low a vacuum as possible.

There are two general types of TC systems that draw fluid from the master cylinder. A first type draws fluid from the master cylinder reservoir through a prime line that is connected directly to the TCS modulator. A second type draws fluid from the master cylinder reservoir internally through the master cylinder and then through brake lines to the TCS modulator.

Generally, the conventional bypass hole cannot be provided with enough capacity to allow the needed amount of fluid influx into the pressurizing chamber during TC operations. With conventional master cylinder construction little or no compensation fluid is furnished by the compensation holes behind the primary seals during TC operation. This is because the seal lips do not fold over until vacuums of 15 inches of mercury or greater are reached.

A known method of providing sufficient TC fluid needs in the second type of TC system is by furnishing an optimized fluid path through the primary and/or secondary bypass holes. This involves utilizing expensive manufacturing processes to maintain the acceptable compensation capabilities. It would be preferably if these expensive manufacturing operations could be eliminated by providing an alternative means of acceptable TC fluid requirement compensation.

SUMMARY OF THE INVENTION

The present invention provides a brake master cylinder with internal low threshold compensation capabilities, achieved by providing a piston seal which overcomes a low load spring and shifts forward against a retainer to open a flow path between the compensation port and the pressurizing chamber when subjected to low level TC fluid draw. An object of the present invention is to enable a level of compensation that provides the ability to draw fluid from reservoir at vacuums less than 100 mbar.

More specifically, a master cylinder according to the present invention includes a body having a longitudinal bore. At least one piston is slidably carried in the bore to compress a pressurizing chamber in the bore by operation of a push rod or other appropriate means. The body of the master cylinder includes an associated reservoir for carrying a fluid supply with a compensation port extending through the body between the reservoir and the bore. A spring retainer is carried by, or integrated with, the piston and a return spring engages the spring retainer biasing the piston toward the push rod. The piston includes an annular wall facing the pressurizing chamber generally in the area of the compensation port and a seal is carried by the piston adjacent the annular wall. A low load spring is positioned between the spring retainer and the seal biasing the seal toward the annular wall.

During TC operation, fluid is drawn from the pressurizing chamber such that the seal shifts forward away from the annular wall compressing the low load spring and opening a compensation flow path from the reservoir through the compensation port which extends between the seal and the piston and into the pressurizing chamber. Fluid can be drawn when the brake pedal is at-rest or during brake apply situations. This provides the capability for interactive brake control functions which permits independent wheel control during vehicle cornering and maneuvering.

Through the aforementioned structure and operation a master cylinder is provided with a means of compensation that provides a maximized amount of flow under minimal draw conditions such as created during TC operation.

DETAILED DESCRIPTION OF THE PRESENTLY PREFERRED EMBODIMENT

Figure 1:
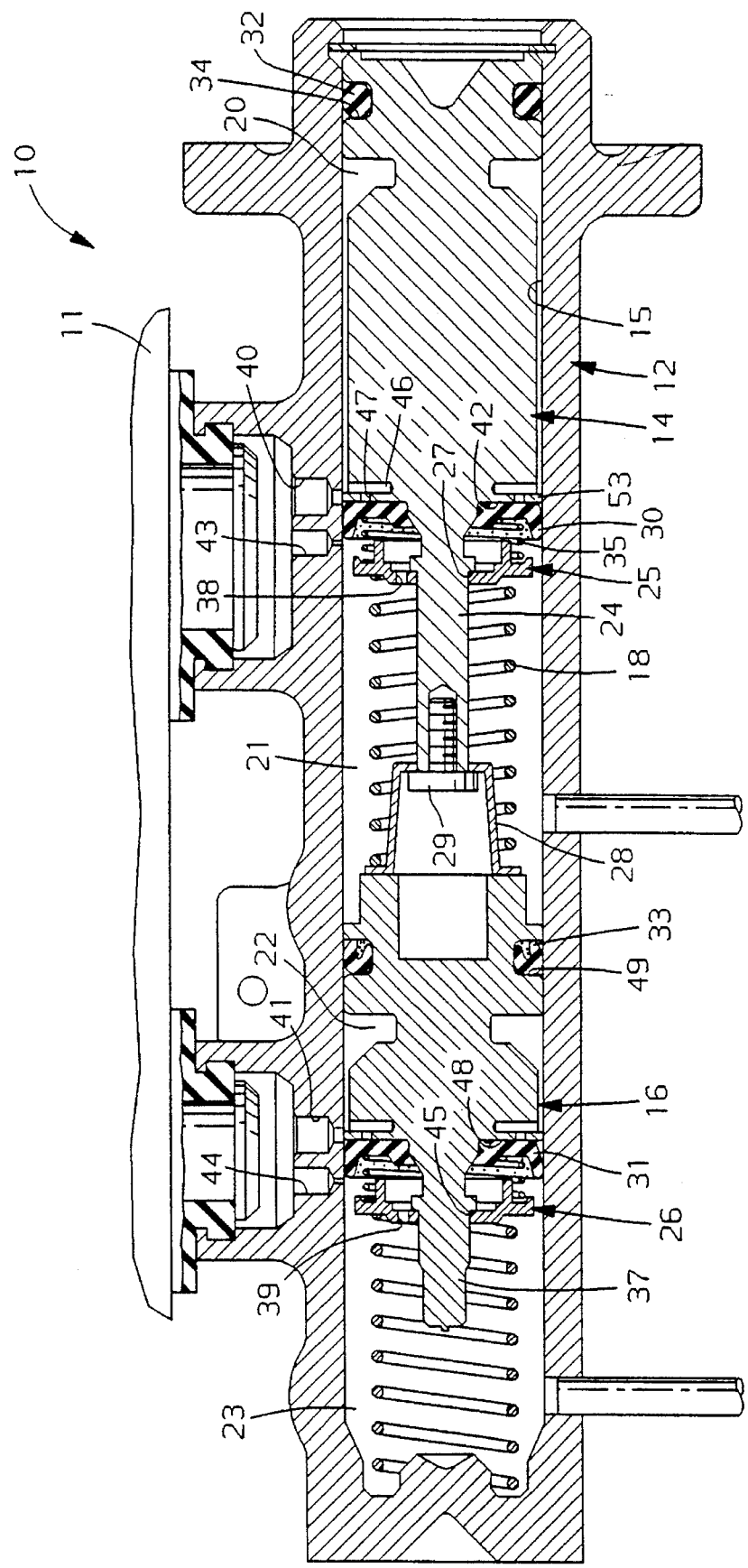
FIG. 1 is a cross sectional view of a master cylinder.

Illustrated in FIG. 1 is a tandem piston master cylinder designated in the aggregate as 10 and incorporating features of the present invention. In general, master cylinder 10 includes a body 12 of an acceptably rigid material such as metal or plastic and is associated with a reservoir 11 for carrying a supply of braking fluid. A longitudinal bore 15 extends through body 12 and slidably carries a tandem piston arrangement including primary piston 14 and secondary piston 16.

The primary piston 14 is arranged in a subassembly that includes a spring retainer 28 which is slidably retained on piston extension 24 by means of fastener 29. A second spring retainer 25 is positioned about piston extension 24 and engages annular shoulder 27. A spring 18 is carried between spring retainers 28 and 25 and is compressible therebetween. The subassembly also includes a seal 32 carried in groove 34 of piston 14 and a seal 30 which is carried about the piston extension 24 adjacent an annular wall 42 of piston 14.

Secondary piston 16 is also carried in bore 15 forward of primary piston 14 and is engaged by spring retainer 28 of the primary piston subassembly. A spring 35 extends between spring retainer 25 and seal 30 and biases seal 30 against annular wall 42. Secondary piston 16 includes piston extension 37 which carries a spring retainer 26 adjacent annular shoulder 45 and a seal 31 adjacent annular wall 48. A spring 36 extends between spring retainer 26 and seal 31 biasing seal 31 against annular wall 48. Secondary piston 16 also includes seal 33 which is carried in groove 49.

A compensation port 40 extends between reservoir 11 and primary low pressure chamber 20, behind seal 30. A bypass hole 43 extends between reservoir 11 and primary high pressure chamber 21, forward of seal 30. Likewise a compensation port 41 extends between reservoir 11 and secondary low pressure chamber 22, rearward of seal 31. Additionally, a bypass hole 44 extends between reservoir 11 and secondary high pressure chamber 23, forward of seal 31. Spring retainer 25 includes an opening 38 adjacent the piston extension 24 and spring retainer 26 includes an opening 39 adjacent the piston extension 37.

Figure 2:
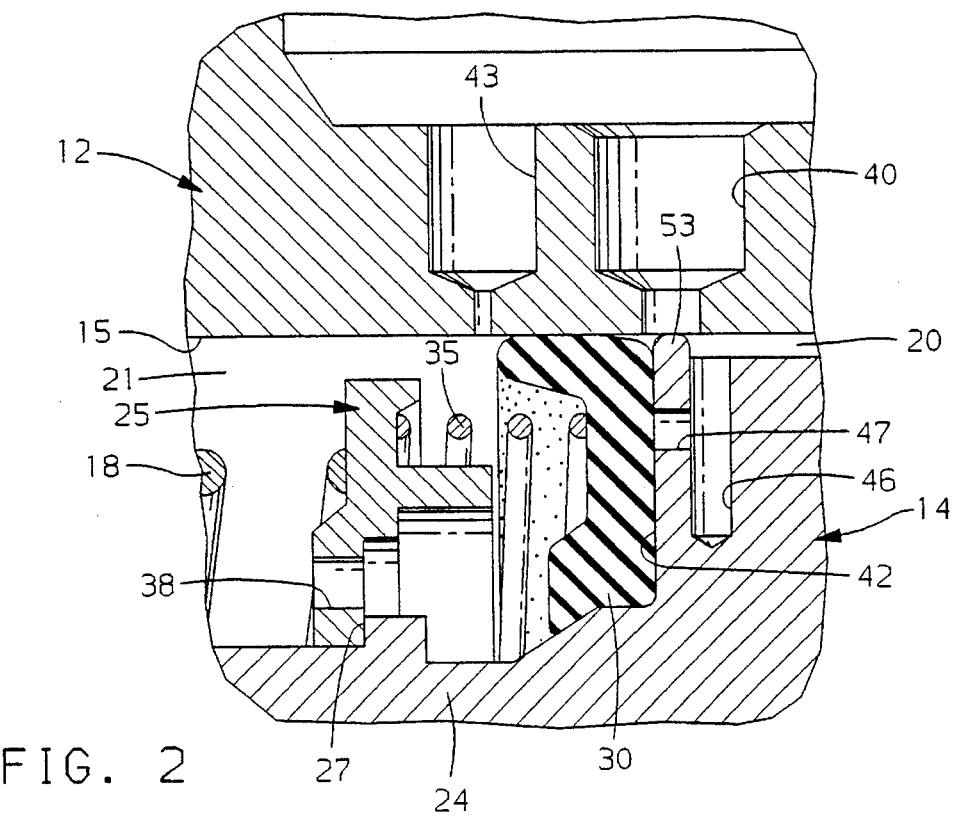
FIG. 2 is a detail illustration of the compensation area of the master cylinder of FIG. 1.

Referring to FIGS. 2–5, a means of compensation provided by the present invention will be described. FIG. 2 illustrates the compensation area of primary piston 14 for an at-rest position of the piston 14. The seal 30 is biased against annular wall 42 by spring 35 and contacts body 12 between compensation port 40 and bypass hole 43. At this position bypass hole 43 provides an opening between reservoir 11 and primary high pressure chamber 21. Additionally, compensation port 40 provides an opening between reservoir 11 and primary low pressure chamber 20.

Figure 3:
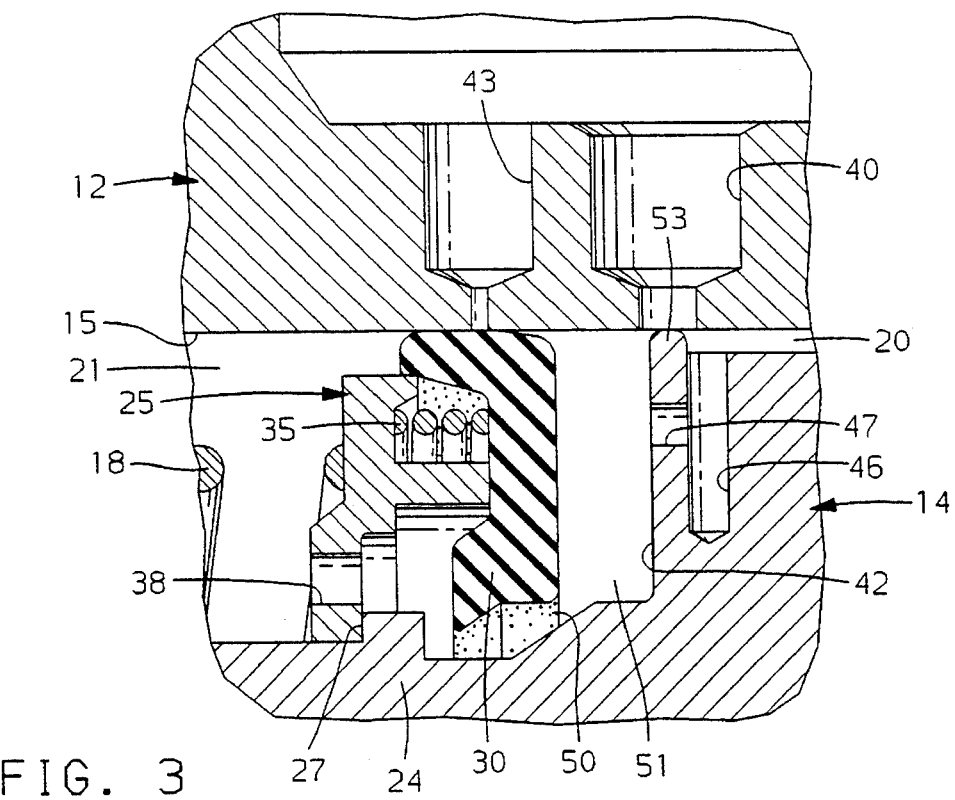
FIG. 3 is a detail illustration of the compensation area of the master cylinder of FIG. 1.

FIG. 3 illustrates a means of compensation provided by the present invention during activation of TC operation with primary piston 14 remaining in the at-rest position. During TC operation, fluid draw from primary high pressure chamber 21 causes seal 30 to compress spring 35 and shift forward against spring retainer 25 closing bypass hole 43 and opening a compensation flow route from compensation port 40 which extends through lateral bore 46 and longitudinal bore 47 which are formed in primary piston 14, and into chamber 51 which is formed between annular wall 42 and seal 30. Additionally, when primary piston 14 is in the at-rest position fluid flow can proceed directly from compensation port 40 to chamber 51. From chamber 51 compensation fluid flow continues between seal 30 and primary piston 14 through compensation opening 50 and through opening 38 of spring retainer 25 into primary high pressure chamber 21. Optionally, the opening 38 is provided through spring retainer 25 below piston extension 24. In a similar manner compensation is provided as needed for secondary high pressure chamber 23 through operation of seal 31.

Figure 4:
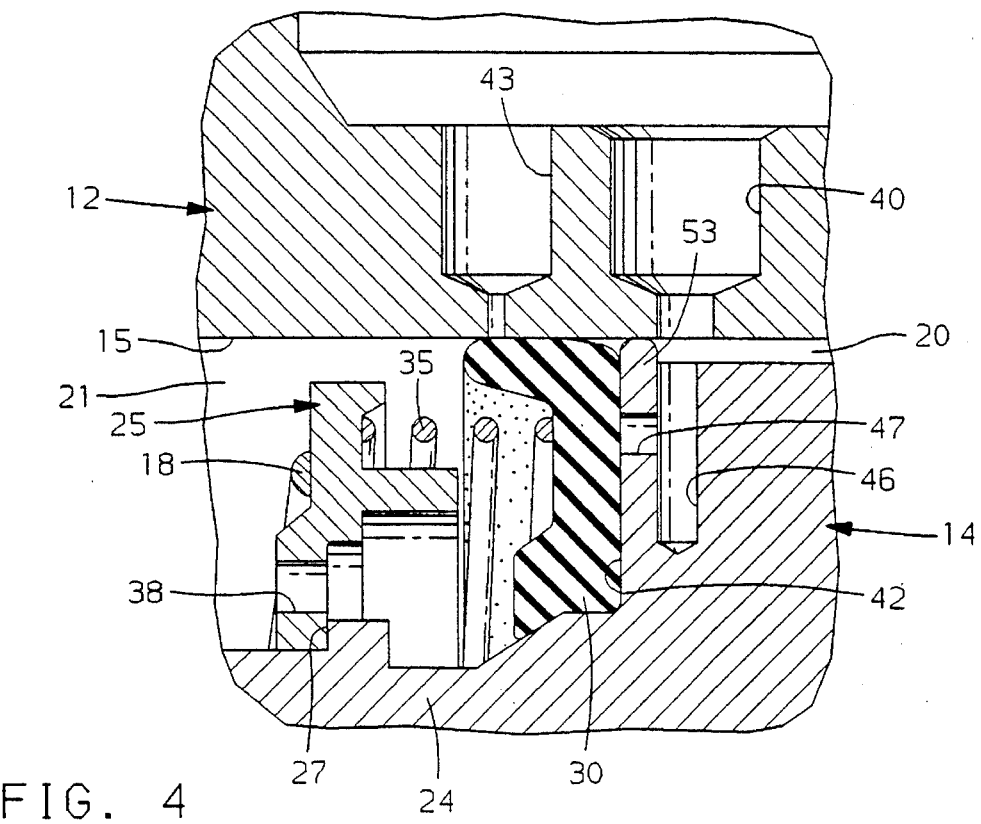
FIG. 4 is a detail illustration of the compensation area of the master cylinder of FIG. 1.
Figure 5:
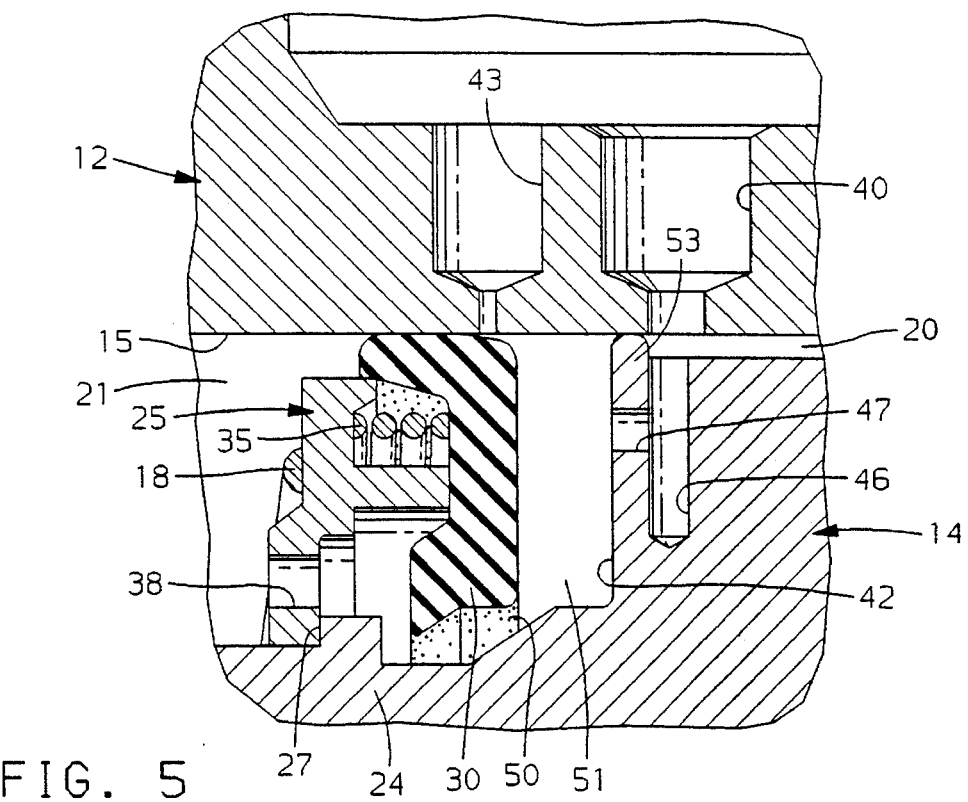
FIG. 5 is a detail illustration of the compensation area of the master cylinder of FIG. 1.

FIGS. 4 and 5 illustrate how the present invention provides a means of compensation for TC fluid requirements when primary piston 14 is shifted forward to a light-apply position. In the light-apply position seal 30 has moved forward with primary piston 14 a distance sufficient to close communication between bypass hole 43 and primary high pressure chamber 21. During TC fluid flow requirements when the primary piston 14 is in the light-apply position, fluid drawn from primary high pressure chamber 21 causes seal 30 to move to compress spring 35 and shift forward from the position shown in FIG. 4 to the position shown in FIG. 5. Annular shoulder 53 of primary piston 14 has moved forward of compensation port 40 and thus all compensation flow from compensation port 40 is through lateral bore 46 and longitudinal bore 47 into chamber 51. From chamber 51 compensation flow continues through compensation opening 50 and opening 38 of spring retainer 25 into primary high pressure chamber 21.

Through the aforementioned structure a means of providing maximized compensation fluid flow during minimal fluid draw conditions such as created by TC operation is provided. Fluid flow between the compensation port and the high pressure chamber is provided through a compensation opening between the seal and the piston which opens upon forward shifting of the seal created by the TC fluid draw.

Figure 6:
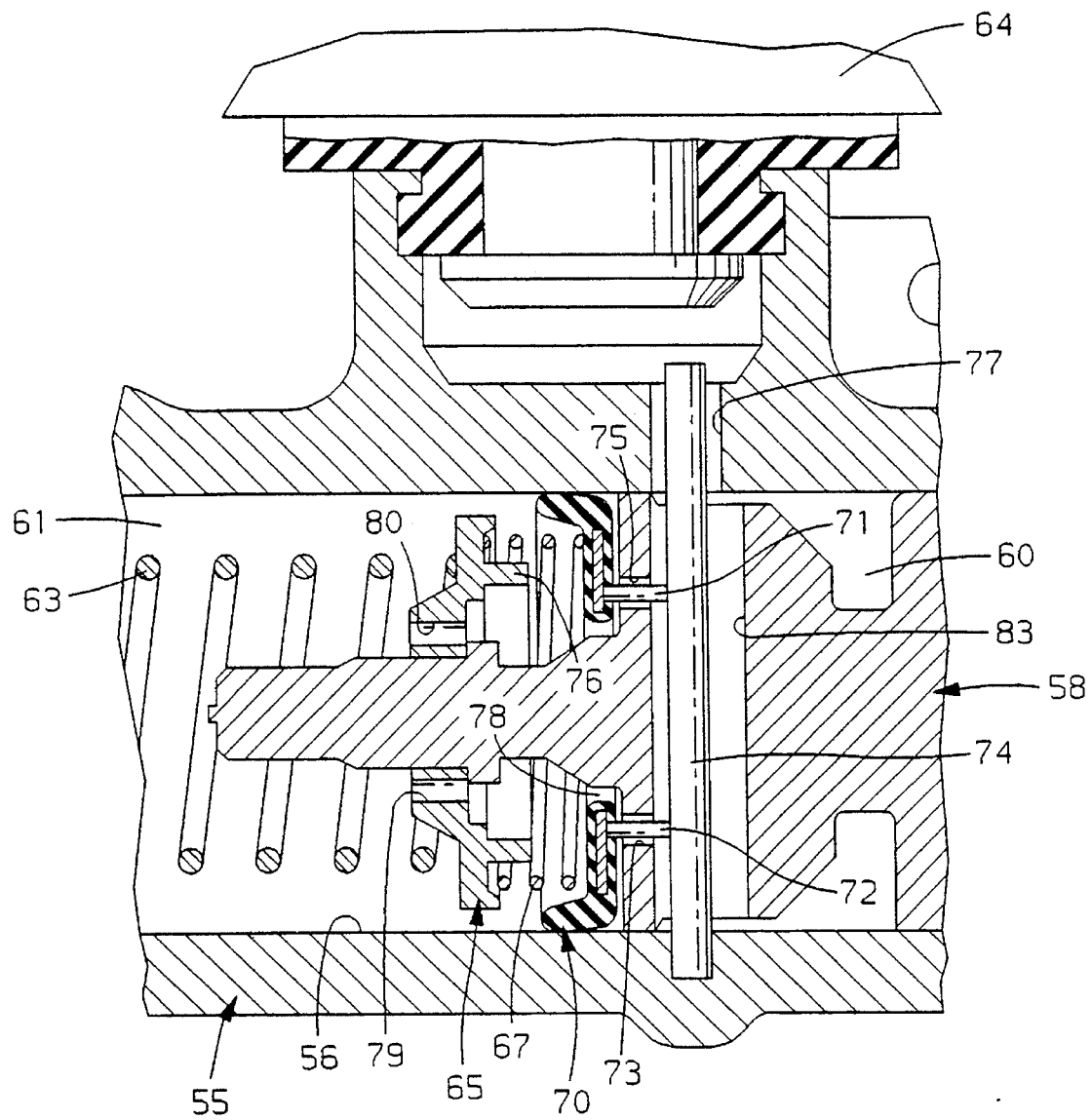
FIG. 6 is a detail illustration of the compensation area of a master cylinder illustrating an alternative embodiment of the present invention.

Referring to FIG. 6, an alternative embodiment of the present invention is provided. master cylinder body 55 includes bore 56 which slidably carries piston 58. Piston 58 includes slot 83 and separates bore 56 into low pressure chamber 60 and high pressure chamber 61. A spring 63 engages spring retainer 65 and operates to bias piston 58 to the right, as illustrated. A seal 70 is carried by piston 58 and is also biased to the right by a spring 67 which extends between the spring retainer 65 and the seal 70. A stop pin 74 engages master cylinder body 55 and extends through bore 56 and slot 83, such as not to interfere with sliding movement of the piston 58 within the bore 56.

A single, combined compensation and bypass port 77 provides a means of fluid communication between reservoir 64 and bore 56. Stop pin 74 extends through port 77 with sufficient clearance for fluid flow. The seal 70 includes two protruding bypass pins 71 and 72 which extend through openings 75 and 73 respectively, and normally engage stop pin 74. This provides a means of communication between the reservoir 64 and the high pressure chamber 61, such as would otherwise be provided by the bypass hole of a conventional master cylinder. Bypass fluid flow from reservoir 64 is routed through combined compensation and bypass port 77 through openings 73 and 75, between piston 58 and seal 70, through the opening 78, and into high pressure chamber 61.

When additional compensation fluid flow is required in excess of the amount that can be provided through the bypass flow means, fluid drawn from high pressure chamber 61 causes the seal 70 to move to compress spring 67 and against annular stop leg 76 of spring retainer 65. This provides an enlarged flow route through openings 75 and 73 since bypass pins 71 and 72 have been retracted therefrom. Additionally, the opening 78 between seal 70 and piston 58 is enlarged due to the seal moving to compress spring 67. Since the seal 70 abuts annular stop leg 76, compensation fluid flow is provided through openings 79 and 80 in spring retainer 65, for compensation fluid flow into high pressure chamber 61. Therefore, through the shifting seal compensation means of the present invention, an option is provided for eliminating conventional bypass holes that typically exist between a reservoir and the high pressure chamber of the master cylinder.

What is claimed is:

1. A master cylinder comprising:

a body having a longitudinal bore with a bypass hole and a compensation port extending through the body and opening into the longitudinal bore;

a reservoir communicating with the bypass hole and the compensation port;

a piston slidably carried in the bore separating the longitudinal bore into a high pressure chamber and a low pressure chamber and having an annular wall transverse to the longitudinal bore wherein a longitudinal compensation bore extends through the annular wall to the low pressure chamber and an outer surface wherein a lateral compensation bore extends through the outer surface between the longitudinal compensation bore and the low pressure chamber wherein the piston has an annular shoulder capable of closing the compensation port off from the high pressure chamber past the outside of the piston when the piston slides to an apply position;

a spring retainer carried by the piston in the low pressure chamber;

a first spring extending between the body and the spring retainer biasing the piston toward an at-rest position where the annular shoulder is positioned in line with the compensation port so that the compensation port is open to both the high pressure chamber and the low pressure chamber;

a seal carried by the piston adjacent the annular wall capable of sealing off the compensation longitudinal bore from the high pressure chamber; and a second spring extending between the seal and the spring retainer biasing the seal toward the annular wall of the piston;

wherein the seal moves forward to compress the second spring opening a compensation flow path from the compensation port, through the low pressue chamber, the lateral compensation bore, the longitudinal compensation bore, between the seal and the outer surface of the piston to the high pressure chamber in response to a fluid draw condition when the piston is in the at-rest position and when the piston is in the apply position.

2. A master cylinder according to claim 1 wherein the spring retainer includes an opening adjacent the piston and the compensation flow path extends through the opening.

3. A master cylinder according to claim 1 wherein the seal carries a bypass pin that extends through the longitudinal compensation bore maintaining the seal in a position spaced away from the annular wall when the piston is in the at-rest position and wherein the second spring moves the seal against the annular wall when the piston slides to the apply position.

* * * * *